Feb. 17, 1942.    R. DRACHENBERG    2,273,093
MACERATOR AND JUICE EXTRACTOR
Filed May 19, 1937
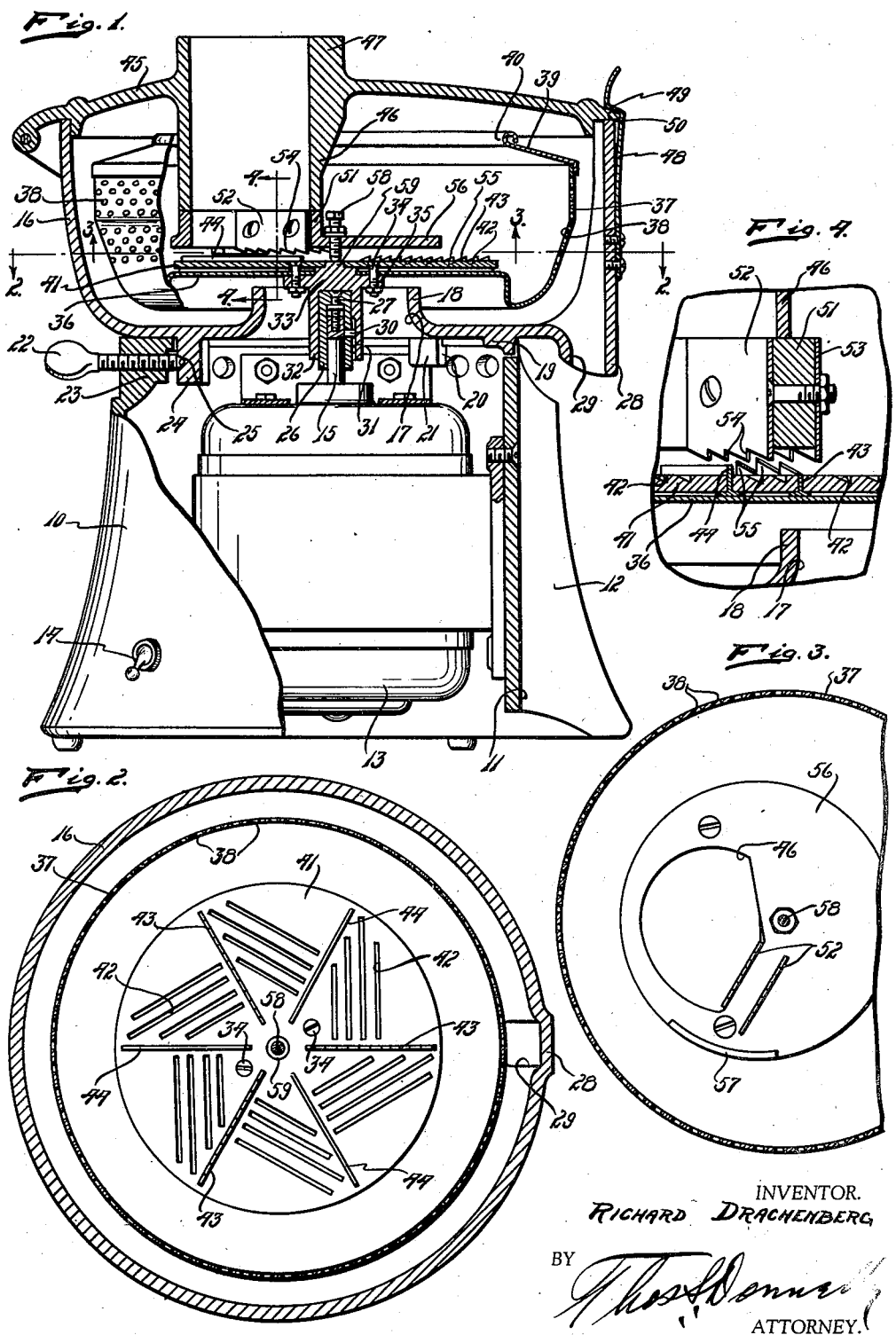
INVENTOR.
RICHARD DRACHENBERG
BY
ATTORNEY.

Patented Feb. 17, 1942

2,273,093

UNITED STATES PATENT OFFICE 2,273,093

MACERATOR AND JUICE EXTRACTOR

Richard Drachenberg, Detroit, Mich.

Application May 19, 1937, Serial No. 143,548

17 Claims. (Cl. 146—76)

My invention relates to a new and useful improvement in a macerator and juice extractor adapted for use in operating on vegetables and fruits.

It is an object of the present invention to provide a device of this class that is durable, simple of structure, economical of manufacture, compact, highly efficient in use, and easily operated.

Another object of the invention is the provision of means for macerating fruit or vegetables and subjecting the same to a juice extracting operation resulting from rapid rotation.

Another object of the invention is the provision of a device of this kind so constructed and arranged that the macerated or finely divided particles of the fruit or vegetables will not be permitted to accumulate at the center of the mechanism.

Another object of the invention is the provision in a device of this class of a plurality of rotatable blades and scrapers for reducing the vegetable or fruit to finely divided portions.

Another object of the invention is the provision of stationary blades for further reducing the already finely divided particles of fruit or vegetables to a further state of division.

Another object of the invention is the provision of means for forcing the finely divided particles of fruit or vegetable outwardly against the walls of a perforating strainer.

Another object of the invention is the provision of means for assisting the centrifugal movement of the finely divided particles of fruit or vegetables.

Other objects will appear hereinafter.

The invention consists in the combination and arrangement of parts hereinafter described and claimed.

The invention will be best understood by a reference to the accompanying drawing which forms a part of this specification and in which, Fig. 1 is a central, vertical, sectional view of the invention, with parts broken away.

Fig. 2 is a sectional view taken on line 2—2 of Fig. 1.

Fig. 3 is a fragmentary sectional view taken on line 3—3 of Fig. 1.

Fig. 4 is a fragmentary, sectional view taken one line 4—4 of Fig. 1 slightly enlarged.

In the drawing, I have illustrated the invention supported on a substantially circular base 10 which is recessed inwardly as at 11 to provide a cavity 12 in which a glass or other suitable receptacle may engage for receiving the fruit or vegetable juices which will pour thereinto. Mounted on this base 12 is an electric motor 13 controlled by the switch 14. This motor serves as a means for rotating the shaft 15. Positioned on this standard or support 10 is a housing or enclosure 16 having at its center an opening 17 shielded by the inwardly projecting flange or neck 18. An inwardly projecting flange 19 is formed along the upper edge of the standard 10 and a shoulder 20 formed on one face of the bosses 21 engages the undersurface of the flange 19. These bosses 21 are formed on and depend from the housing 16. A set screw 22 is threaded through an enlargement or boss 23 formed on the upper end of the standard 10. This set screw is adapted to engage the depending boss 24 formed on the housing 16 and when the set screw 22 is threaded tightly against the same, it seats in a recess 25 formed in the boss 24 and serves to lock the shoulder 20 in engagement with the undersurface of the flange 19 so that while the housing 16 is detachable from the base 10, it is thus locked in position on the base 10 and may only be removed therefrom upon a threading of a set screw 22.

Embracing the upper end of the shaft 15, which is driven by the motor 13, is a sleeve 26 through which projects and to which is swivelly mounted the screw 27. This screw is adapted to thread into the end of the shaft 15 so that upon a threading inwardly or outwardly of the screw 27, a movement of the sleeve 26 axially of the shaft 15, will be effected. The housing 16 is provided with an outlet nozzle 28 having the passage 29 formed therein, communicating with the interior of the housing 16 so that juices deposited in the housing will flow outwardly through the passages 29 and be deposited in the receptacle which is positioned in the cavity 12.

Projecting outwardly from the sleeve 26 is a pin 30 which is adapted to engage in the axially directed groove 31 formed on the inner surface of the sleeve 32 which depends from the head 33. Secured by bolts 34 to an outwardly projecting flange 35 on the head 33 is the base 36 of a circular strainer, the side walls 37 of which are provided with the perforations 38. Projecting inwardly and inclined axially to the strainer at the upper end thereof, is a deflecting cover 39, this cover extending inwardly a comparatively short distance to provide a large open space 40. Secured by the bolts 34 on the inner surface of the bottom 36 is a disc 41 having a plurality of grooves 42 formed therein. As shown in Fig. 1, the bottom of these grooves is inclined outwardly toward the periphery of disc 41 so that loose particles engaging in the grooves are thrown outwardly toward the periphery upon the rapid rotation of disc 41. Mounted on this disc 41 and projecting upwardly from the upper surface thereof, are toothed blades 43 arranged alternately with scraper blades 44 having an uninterrupted upper edge, the blades 44 serving as scraping knives and the blades 43 serving as cutting or tearing knives in the operation of the device.

Swingably mounted on the housing 16 is a cover 45 having a feeding chute 46 projecting inwardly therefrom and extending in the outwardly projecting portion 47 above the cover 45. A leaf spring 48 is attached at one of its ends to the housing 16 and is inwardly turned adjacent its upper end as at 49. This portion 49 is inclined to the portion 48 and engages the bevelled surface 50 of the covering 45 adjacent its edge so that as the spring 48 tends to naturally move inwardly in the housing 16, the engagement of the portion 49, with the bevelled surface 50, will exert a constant pressure on the cover, tending to move it further to closed position. The chute 46 is provided at its lower edge with a block 51 which is adapted to project radially of the disc 41. Mounted on one face of this block 51 is a toothed blade 52 and a similar toothed blade 53 is mounted on the opposite face of the block 51. The arrangement of the teeth 54 on these blades 52 and 53 is such that they have an interlocking or interlacing relation to the teeth 55 formed on the toothed blades 43, as clearly appears in Fig. 4.

Projecting outwardly from the lower end of the chute 46 is the deflecting plate 56 which is provided on its undersurface with a peripheral flange 57 which serves as an abutment for the macerated fruit and vegetables operated upon. Threaded through this plate 56 is an adjusting screw 58 which is adapted to engage the projecting end 59 of the head 33 which projects through the opening formed in the bottom 36 and in the disc 41.

The device is indicated in Fig. 1 as assembled and ready for use. In assembling this device, after the parts 41 and 36 are secured to the head 33, as illustrated, the sleeve 26 is adjusted to the proper height by the proper degree of threading of the screw 27. This adjustment is necessary as the exact position of the motor is not the same in all devices. The cover, of course, is open and then the strainer, with its attached parts, is placed in position shown in Fig. 1, the sleeve 32 sliding over the sleeve 26 with the pin 30 engaging in the groove 31 so that a rotation of the shaft 15 will effect a rotation of the strainer and the disc 41. The screw 58 is then adjusted so as to maintain the blades 52 and 53 at the proper elevation relative to the disc 41 so that the teeth 55 will interengage with the teeth 54, while at the same time there will be no engagement of these teeth. This screw 58 also prevents the disk 41 from springing upwardly while in use so that the desired clearance of the blades 42, 52 and 53 will always be maintained. The fruit or vegetables to be operated upon are then fed inwardly through the chute 46 and pressed into contact with the disc 41 which would be rotated by the operation of the motor 13. The disc 41 is designed to rotate clockwise. As the fruit or vegetable forced downwardly through the chute 46 is brought into contact with the disc 41 which is rotated, the blades 43 and 44 will serve to macerate and grind the fruit or vegetable. In this operation the blades will be assisted by the sharp edges of the grooves 42 and also by the blades 52 and 53. The macerated pulp will then be thrown outwardly against the perforated walls 37 of the strainer and the juice extracted therefrom so as to be deposited in the housing 16. Experience has shown that the device is most efficient as a macerator and juice extractor. The purpose of the device, is of course, primarily to obtain the juice of the fruit or vegetable and in order that there may be a maximum amount of juice, the maceration is resorted to. It will be noted, that the teeth are faced outwardly toward the periphery of the disc 41 so that they themselves offer no resistance to the centrifugal movement of the pulp. The cooperative blades 52 and 53 and the blade 43 serve a very important function when the vegetable is reduced to the last small portion. The interlocking of these blades prevents the last slice from being thrown out in a large body and thus destroying the balance of the rapidly rotating strainer. These interlocking or interlacing teeth serve also as threaded members which are most efficient in operation on leafy articles.

The device is especially well adapted for extracting juice from vegetables, such as carrots, beets, celery and the like. It will operate with equal efficiency on the more juicy fruits, such as oranges, grapefruit and the like. It will also function when leafy articles such as spinach, beet tops, etc., are operated upon.

The operation of the device is simple and at the same time safe, while a maximum efficiency in a device of this type is obtained. The blades 43, 44, 52 and 53 may be easily and quickly removed and replaced when desired.

I have illustrated the form of the invention which I have ascertained to be most desirable. I am aware, however, that various modifications in the form illustrated may be effected and resorted to, and it is my intention that such modification embodying the spirit of this invention shall also be contemplated at this time.

What I claim as new is:

1. A machine of the class described, comprising: a rotatable plate; alternately arranged scraping blades and toothed blades projecting outwardly from one face of said plate; means for rotating said plate; a stationary chute open at one end, said end terminating in close proximity to said face of said plate, said chute being arranged eccentric of said plate; and a pair of spaced blades carried by and projecting beyond the open end of said chute for cooperating with said first-named blades upon rotation of said plate.

2. A device of the class described, comprising: a housing; a standard for supporting said housing; a motor mounted on said standard; a shaft driven by said motor; a rotatable plate in said housing, a head mounted on said plate engageable with said shaft and effecting a rotation of said plate upon a rotation of said shaft; macerating means projecting outwardly from one face of said plate; a strainer embracing said plate and carried by said head, said strainer being spaced inwardly from said housing; a stationary chute projecting at one end into said strainer and terminating in proximity to and overlying said plate eccentrically thereof; macerating means carried on the lower end of said chute; a deflecting plate carried by said chute and overlying said first mentioned plate; and an outlet nozzle at one side of said housing for conducting liquids therefrom.

3. A machine of the class described, comprising: a cup-shaped perforated receptacle having a central substantially planar base portion; means for rotating said receptacle about the center of its base; macerating means projecting outwardly from the inner face of said planar portion of said base; a housing for enclosing said receptacle, said housing being larger than said receptacle; a cover member for said housing; an outlet spout communicating with said housing for conducting liquids therefrom; a chute projecting inwardly from said cover eccentrically of the planar portion of said base and terminating at its lower end spaced from and in close proximity to said planar portion; and macerating means mounted on and projecting beyond the end of said chute.

4. A machine of the class described, comprising: a rotatable body; means for rotating said body; toothed macerating members projecting outwardly from one face of said body; a stationary chute open at one end and overlying at its open end said body and terminating in proximity to and eccentric of said body for depositing material passing through said chute into said body; a perforated receptacle rotatable in unison with and enclosing the said body, said chute projecting at its open end into said receptacle; stationary toothed macerating members mounted for projecting into said receptacle and spaced from the macerating members on said body a distance less than the depth of the teeth of said macerating members, the teeth of said macerating members interlacing; and a juice receiving receptacle embracing said perforated receptacle for receiving juice issuing from said perforated receptacle, said perforated receptacle being rotatable relatively to said juice-receiving receptacle.

5. A machine of the class described, comprising: a cup-shaped perforated receptacle having a base portion; means for rotating said receptacle about the center of its base on a vertical axis; macerating means projecting outwardly from the inner face of said base; a housing for enclosing said receptacle, said receptacle being rotatable relatively to said housing; a cover member for said housing; a chute projecting inwardly from said cover member and terminating at its lower end spaced from and in close proximity to said base; deflecting means carried by the inner end of said chute and projecting outwardly of the inner surface thereof and extending in close proximity to and spaced from said base; and abutment means carried by said deflecting means adjacent the perimeter thereof and projecting therefrom toward said base.

6. A device of the class described, comprising: a receptacle having a perforated wall and having a base member and rotatable about the axis of its base member; a housing spaced from and enclosing said receptacle, said receptacle being rotatable in said housing and said housing being adapted for receiving juices issuing from said receptacle through the perforations thereof; a stationary chute projecting at an open end inwardly of said receptacle in spaced relation thereto and terminating at said end in spaced relation to said base member for depositing materials passed therethrough onto said base member; macerating means projecting inwardly from the inner face of said base member and determining, upon rotation, an area larger than the area of the opening of said end of said chute and rotatable across said end of said chute for engaging and macerating material projecting beyond said end of said chute and for, in cooperation with said base member, carrying the same clear of said chute and projecting the same toward said wall; and means for rotating said receptacle.

7. A device of the class described, comprising: a rotatable body rotatable on an axially directed axis; a wall embracing said body, said wall being perforated; a stationary chute projected inwardly of said wall and overlying said body and spaced therefrom at one end, said end being open for depositing materials on said body; macerating means on the upper face of said body for, upon rotation thereof, engaging and macerating materials projecting beyond the end of said chute and carrying the same clear of said chute and projecting the same against said wall, the open end of said chute being of less area than the area defined by said macerating means during rotation; means for rotating said body and said wall in unison; and a housing enclosing said wall for receiving juices passing therethrough.

8. A device of the class described, comprising: a rotatable body rotatable on an axially directed vertical axis; a wall embracing said body and rotatable in unison therewith, said wall being perforated; a stationary chute projecting at one end inwardly of said wall and terminating at said end in overlying spaced relation to said body, said end being open for the passage of materials therethrough onto said body; macerating means on the upper face of said body and determining, upon rotation, an area larger than the area of the opening in said end of said chute and rotatable across said end of said chute for macerating material projecting beyond said end of said chute and, in cooperation with said upper face, carrying the same away from said chute and projecting the same toward said wall; means for rotating said body; and a housing for enclosing said wall and adapted for the reception of juices passing therethrough, said receptacle being rotatable relatively to said housing.

9. A device of the class described, comprising: a receptacle having a base and a perforated wall and rotatable on a vertical, axially directed axis; a stationary chute projecting at an open end into said receptacle and terminating at said end in close proximity to and spaced from said base; macerating means within said receptacle and projecting upwardly of said base and determining, upon rotation, an area larger than the area of said open end of said chute and rotatable across said open end of said chute for engaging and macerating materials projecting therefrom and carrying the same clear of said chute and projecting the same outwardly toward said wall, said open end of said chute being located eccentric of the area determined by said macerating means; means for rotating said receptacle and said macerating means; and a housing enclosing and spaced from said receptacle for reception of juices passing through the wall thereof, said receptacle being rotatable relatively to said housing.

10. A device of the class described, comprising: a receptacle having a base and a perforated wall and rotatable on a vertical, axially directed axis; a stationary chute projecting at an open end into said receptacle and terminating at said end in close proximity to and spaced from said base for depositing materials passing therethrough upon said base; macerating means projecting upwardly of said base and determining, upon rotation, an area larger than the area of the opening in said end of said chute and rotatable across the open end of said chute for engaging and macerating materials projecting therefrom and carrying, in cooperation with said base, the same clear of said chute and projecting the same outwardly toward said wall; means for rotating said receptable; an enclosure for said receptacle enclosing reception of juices passing through the wall thereof; and additional stationary macerating means projecting beyond the end of said chute and offset therefrom for engaging and further macerating the macerated material carried clear of said chute.

11. A device of the class described, comprising: a receptable having a base and a perforated wall and rotatable on a vertical, axially directed axis; a stationary chute projected at an open end into said receptacle and terminating at said end in close proximity to and spaced from said base, eccentric thereof; macerating means on said base comprising, a plurality of cutting blades and toothed blades projecting outwardly from the upper face of said base, said blades being arranged alternately, the inner edges of the teeth on said toothed blades being inclined upwardly and outwardly, said blades determining, upon rotation, an area larger than the area of said open end of said chute and rotatable across said open end of said chute for engaging and macerating materials projecting therefrom and, in cooperation with the upper face of said base, carrying the same clear of said chute and projecting the same outwardly toward said wall; means for rotating said receptable; and a housing enclosing said receptacle for reception of juices passing through the wall thereof, said housing and said receptable being relatively movable.

12. A machine of the class described, comprising: a cup-shaped perforated receptacle having a base portion; means for rotating said receptacle about an axially directed axis; macerating means projecting inwardly from said base portion; a housing for enclosing said receptacle, said housing being larger than said receptacle; a tubular chute projecting inwardly of said receptacle and terminating at its inner end spaced from and in close proximity to the plane determined by the inner edges of said macerating means; and a macerating means mounted on, offset from and projecting beyond the inner end of said chute, said receptacle being rotatable relatively to said housing.

13. A machine of the class described, comprising: a cup-shaped receptacle having a perforated wall and a base portion; means for rotating said receptacle about the center of its base portion; macerating means on the inner face of said base portion; a housing for enclosing said receptacle, said receptacle rotating in said housing and said housing being adapted for reception of juices passing through the wall of said receptacle; a cover member for said housing; an outlet conduit communicating with said housing for conducting liquids therefrom; a chute carried by said cover member and projecting therefrom inwardly of said receptacle and terminating at its inner end spaced from and in close proximity to said base portion; deflecting means projecting outwardly from the inner end of said chute and extending substantially parallel in close proximity to and spaced from said base portion, and of an area less than the area defined by said macerating means upon rotation of the same.

14. A machine of the class described, comprising: a substantially cup-shaped perforated receptacle having a base portion; means for rotating said receptacle about the center of its base portion; macerating means projecting outwardly from the inner face of said base portion; a housing for enclosing said receptacle and receiving juices passing through the perforations thereof, said receptacle being rotatable relatively to said housing; a cover member for said housing; an outlet conduit communicating with said housing and conducting liquids therefrom; a chute projecting inwardly from said cover member and terminating at its inner end spaced from and in close proximity to said base portion; and adjusting means for regulating the space between the end of said chute and the inner face of said base portion.

15. A machine of the class described, comprising: a substantially cup-shaped receptacle having a perforated side wall and a base portion; means for rotating said receptacle about the center of its base portion; macerating means on the inner face of said base portion; a housing for enclosing said receptacle, said housing being larger than said receptacle and said receptacle being rotatable relatively to said housing; an inwardly directed flange on the open end of said receptacle for serving as an abutment for macerated particles striking thereagainst; a cover member for said housing; an outlet conduit communicating with said housing for conducting liquids therefrom; a chute projecting inwardly from said cover member eccentrically of said base portion and terminating at its lower end spaced from and in close proximity to said base portion.

16. A machine of the class described, comprising: a substantially cup-shaped receptacle having a perforated side wall and a base portion; means for rotating said receptacle about the center of its base portion; macerating means on the inner face of said base portion; a housing for enclosing said receptacle, said housing being larger than said receptacle and said receptacle being rotatable relatively to said housing; an inwardly directed flange on the open end of said receptacle for serving as an abutment for macerated particles striking thereagainst; a cover member for said housing; an outlet conduit communicating with said housing for conducting liquids therefrom; a chute projecting inwardly from said cover member eccentrically of said base portion and terminating at its lower end spaced from and in close proximity to said base portion; and deflecting means carried by and projecting outwardly from the inner end of said chute and extending in close proximity to and spaced from said base portion, said deflecting means being of less area than the area determined by said macerating means upon rotation thereof.

17. In a juice extracting machine of the class described, a rotatable shaft; a perforated receptacle mounted on said shaft and rotatable therewith; macerating means in said receptacle and rotatable in unison therewith; a housing enclosing and spaced from said receptacle for the reception of juices issuing through the perforations in said receptacle, said receptacle being rotatable relatively to said housing; and a relatively fixed chute extending into said receptacle and terminating in spaced relation to the macerating means for discharging material passed therethrough onto said macerating means.

RICHARD DRACHENBERG.